United States Patent
Gao et al.

(10) Patent No.: US 11,729,529 B1
(45) Date of Patent: Aug. 15, 2023

(54) VOLTAGE DOMAIN GLOBAL SHUTTER READOUT CIRCUIT

(71) Applicant: OMNIVISION TECHNOLOGIES, INC., Santa Clara, CA (US)

(72) Inventors: Zhe Gao, San Jose, CA (US); Hiroaki Ebihara, San Jose, CA (US); Ling Fu, Santa Clara, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/825,797

(22) Filed: May 26, 2022

(51) Int. Cl.
H04N 25/75 (2023.01)
H04N 25/53 (2023.01)
H04N 25/62 (2023.01)
H04N 25/65 (2023.01)
H04N 25/771 (2023.01)
H04N 25/532 (2023.01)

(52) U.S. Cl.
CPC ............. *H04N 25/75* (2023.01); *H04N 25/53* (2023.01); *H04N 25/62* (2023.01); *H04N 25/65* (2023.01); *H04N 25/771* (2023.01)

(58) Field of Classification Search
CPC ........ H04N 25/75; H04N 25/65; H04N 25/62; H04N 25/771; H04N 25/53; H04N 25/532
See application file for complete search history.

(56) References Cited

U.S. PATENT DOCUMENTS

| | | | |
|---|---|---|---|
| 11,165,983 B1 * | 11/2021 | Park | H04N 25/65 |
| 2014/0008520 A1 * | 1/2014 | Raynor | H01L 27/14612 250/208.1 |
| 2018/0103226 A1 * | 4/2018 | Raynor | H04N 25/616 |

OTHER PUBLICATIONS

H. Shike et al., "A Global Shutter Wide Dynamic Range Soft X-Ray CMOS Image Sensor With Backside-Illuminated Pinned Photodiode, Two-Stage Lateral Overflow Integration Capacitor, and Voltage Domain Memory Bank," IEEE Transactions on Electron Devices, vol. 68, No. 4, Apr. 2021, 8 pages.

* cited by examiner

*Primary Examiner* — Marly S Camargo
(74) *Attorney, Agent, or Firm* — Perkins Coie LLP

(57) ABSTRACT

A global shutter readout circuit includes a reset transistor coupled between a reset voltage and a bitline. A pixel enable transistor is coupled between the reset transistor and a source follower transistor. First and second terminals of the pixel enable transistor are coupled together in response to a pixel enable signal coupled to a third terminal of the pixel enable transistor. A first storage transistor coupled to the second terminal of the pixel enable transistor and the gate of the source follower transistor. A first storage capacitor is coupled to the first storage transistor. A second storage transistor coupled to the second terminal of the pixel enable transistor and the gate of the source follower transistor. A second storage capacitor is coupled to the second storage transistor. A row select transistor is coupled to the source follower transistor to generate an output signal from the global shutter readout circuit.

22 Claims, 7 Drawing Sheets

VOLTAGE DOMAIN GLOBAL SHUTTER READOUT CIRCUIT

BACKGROUND INFORMATION

Field of the Disclosure

This disclosure relates generally to image sensors, and in particular but not exclusively, relates to a global shutter readout circuit for use in reading out image data from an image sensor.

Background

Image sensors have become ubiquitous. They are widely used in digital still cameras, cellular phones, security cameras, medical, automobile, and other applications. The technology used to manufacture image sensors has continued to advance at a great pace. For example, the demands of higher resolution and lower power consumption have encouraged the further miniaturization and integration of these devices.

Image sensors conventionally receive light on an array of pixels, which generates charge in the pixels. The intensity of the light may influence the amount of charge generated in each pixel, with higher intensity generating higher amounts of charge. Correlated double sampling (CDS) is a technique that is used with CMOS image sensors (CIS) to reduce noise from images read out from image sensors by sampling image data from the image sensors and removing undesired offsets sampled from reset value readings from the image sensors. In global shutter CIS design, sample and hold switches are used to sample and hold signal (SHS) readings, as well as sample and hold reset (SHR) readings from the image sensors. The SHR and SHS switches in the sample and hold circuitry are controlled to sample the reset levels and the signal levels from the image sensor. After the global sampling is completed, a readout from the image sensor is performed to digitize the sampled reset and signal levels. The digitized difference between the reset and signal levels are used in the CDS calculation to recover the true image signals.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
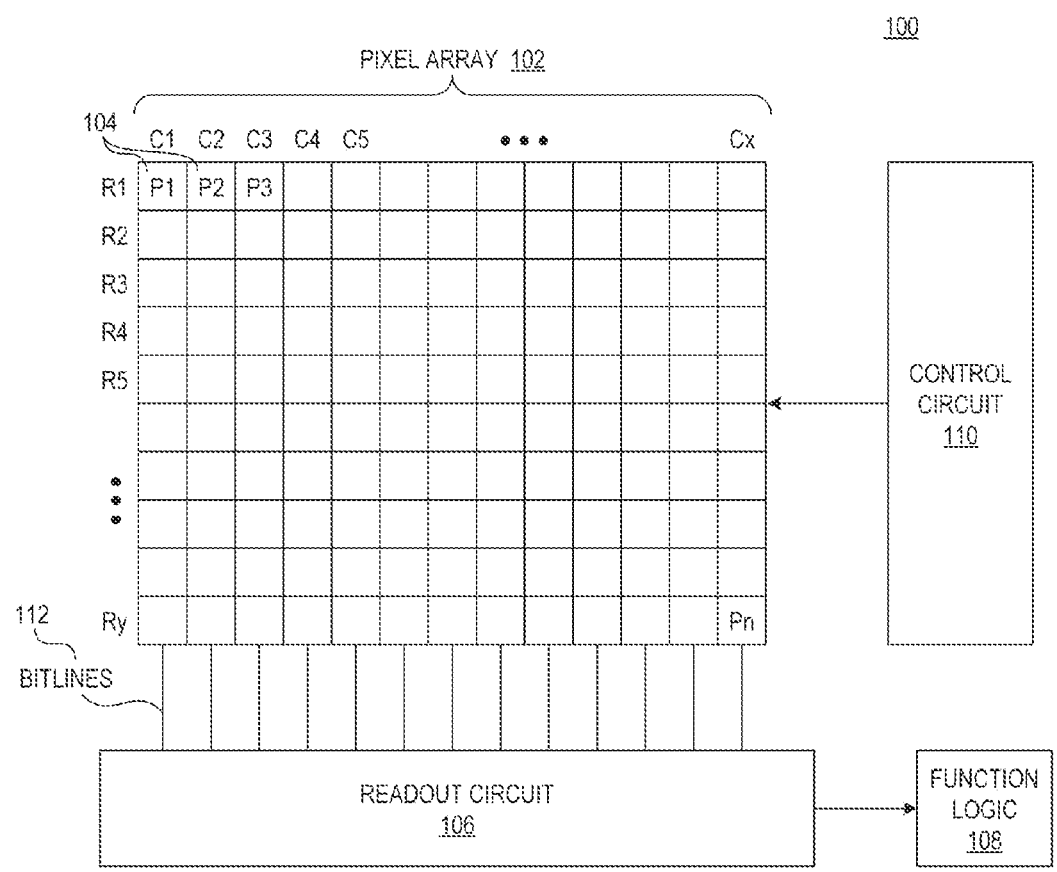
FIG. 1 illustrates one example of an imaging system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples directed to a voltage domain global shutter readout circuit are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

In the various examples described below, improved example voltage domain global readout circuits are disclosed. In the various examples, the global readout circuits have less leakage, less fixed pattern noise, improved linearity, decreased global transfer times, and decreased size with less random noise, etc. For instance, there is leakage to ground in existing global shutter readout circuit approaches, which cause fixed pattern noise and nonuniformity between pixels in images due in part to resistance paths to all of the associated storage capacitors in the entire pixel array. These resistance paths through ground to all of the storage capacitors further increase lag time when discharging the capacitors. In the various examples described herein, this leakage to ground is cutoff or eliminated with a pixel enable transistor included in the global shutter readout circuit in accordance with the teachings of the present invention. In other examples, the pixel enable transistor is included in discharge paths of storage capacitors in which both plates of the storage capacitors are coupled through the pixel enable transistor to the same reset voltage, which significantly reduces discharge times for the storage capacitors in accordance with the teachings of the present invention. In still other examples, the bias and cascode transistor paths to ground are removed from the global shutter readout circuit such that the storage capacitors are reset to a reset voltage through the pixel enable transistor. The removal of the bias and cascode transistor paths to ground from the global shutter readout circuit reduces the size as well as the random noise of the global shutter readout circuit in accordance with the teachings of the present invention.

To illustrate, FIG. 1 shows one example of an imaging system 100 having a pixel array with pixel circuits that are readout through voltage domain global shutter readout circuits in accordance with the teachings of the present invention. In particular, the example depicted in FIG. 1 illustrates an imaging system 100 that includes a pixel array 102, bitlines 112, a control circuit 110, a readout circuit 106, and function logic 108. In various examples, imaging system may be implemented as a CMOS image sensor (CIS), which in one example may be in a stacked chipped scheme that includes a pixel die stacked with a logic die or application specific integrated circuit (ASIC) die. In one example, the pixel die may include a pixel array 102, and the ASIC die may include readout circuitry with global shutter readout circuits in accordance with the teachings of the present invention that are coupled to the pixel array 102 through bitlines 112 included in pixel level connections. In one example, the ASIC may also include the control circuit 110 in addition to the readout circuitry 106 as well as the function logic 108.

In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, each pixel circuit 104 may include one or more photodiodes configured to photogenerate image charge in response to incident light. The image charge generated in the one or more photodiodes is transferred to a floating diffusion included in each pixel circuit 104, which may be converted to an image signal, which is then read out from each pixel circuit 104 by readout circuit 106 through bitlines 112. In the various examples, readout circuit 106 may be configured to read out the image signals through column bitlines 112. In various examples, readout circuit 106 may include global shutter readout circuits, current sources, routing circuitry, and comparators that may be included in analog to digital converters or otherwise.

In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 104 is coupled to pixel array 102 to control operation of the plurality of photodiodes in pixel array 102. For example, control circuit 104 may generate global shutter signals for controlling image acquisition. In other examples, image acquisition is synchronized with lighting effects such as a flash.

In one example, imaging system 100 may be included in a digital, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
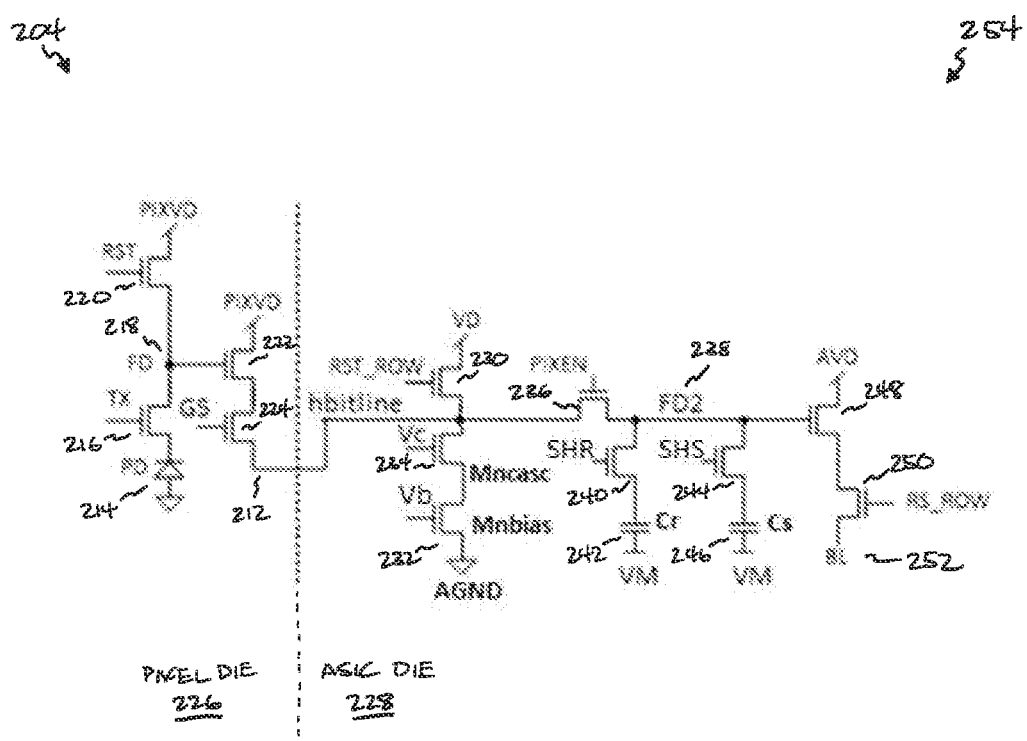
FIG. 2 shows a schematic of an example of a pixel circuit and a voltage domain global shutter readout circuit in an image sensor in accordance with the teachings of the present invention.

FIG. 2 shows a schematic of an example of pixel circuit 204 and an example of global shutter readout circuit 254 in an image sensor in accordance with the teachings of the present invention. It is noted that pixel circuit 204 of FIG. 2 may be an example of one of the pixel circuits 104 described in FIG. 1, and that similarly named and numbered elements referenced below are coupled and function similar to as described above.

As shown in the example depicted in FIG. 2, the pixel circuit 204 may be included in a pixel die 226 and the global shutter readout circuit 254 may be included in a readout circuit included in an ASIC die 228. In one example, pixel circuit 204 includes a photodiode 214, which is coupled to photogenerate image charge in response to incident light. A transfer transistor 216 is coupled to transfer the photogenerated image charge from the photodiode 214 to a floating diffusion 218 in response to a transfer signal TX. A reset transistor 220 is coupled to a pixel voltage supply (e.g., PIXVD) to reset the floating diffusion 218 in response to a reset signal RST. The gate of a source follower transistor 222 is coupled to convert the charge in the floating diffusion 218 to an image data signal, which is coupled to be output through a row select transistor 224 through a bitline 212 in response to a row select signal GS. In an imaging system that utilizes correlated double sampling (CDS), the charge on the floating diffusion 218 is also read out through bitline 212 after a floating diffusion reset operation to obtain a reset level, and the charge on the floating diffusion 218 is also read out through bitline 212 after the image charge is transferred to the floating diffusion 218 to obtain a signal level.

Continuing with the depicted example, the global shutter readout circuit 254 includes a reset transistor 230 coupled between a reset voltage (e.g., VD) and the bitline 212 from pixel circuit 204. In one example, the reset transistor 230 is configured to be controlled in response to a reset row control signal RST_ROW. As shown in the depicted example, a pixel enable transistor 236 includes a first terminal (e.g., a first source/drain terminal) coupled to the bitline 212 and the reset transistor 230. A source follower transistor 248 includes a gate coupled to a second terminal (e.g., a second source/drain terminal) of the pixel enable transistor 236 such that the pixel enable transistor 236 is coupled between the reset transistor 230 and the source follower transistor 248. In one example, the first and second terminals of the pixel enable transistor 236 are coupled together in response to a pixel enable signal PIXEN coupled to a third terminal (e.g., gate) of the pixel enable transistor 236.

As shown in the example shown in FIG. 2, a first storage transistor 240 is coupled to the second terminal of the pixel enable transistor 236 and the gate of the source follower transistor 248. A first storage capacitor 242 is coupled to the first storage transistor 240. As shown, second storage transistor 244 is also coupled to the second terminal of the pixel enable transistor 236 and the gate of the source follower transistor 248. A second storage capacitor 246 is coupled to the second storage transistor 244. As shown in the depicted example, the first storage transistor 240 is configured to be controlled in response to a sample and hold reset control signal SHR and the second storage transistor 244 is configured to be controlled in response to a sample and hold signal control signal SHS.

In the example, a row select transistor 250 is coupled to the source follower transistor 248 such that the source follower transistor 248 and the row select transistor 250 are coupled between a voltage supply (e.g., AVD) and an output 252 of the global shutter readout circuit 254. In operation, the row select transistor 250 is coupled to the source follower transistor 248 to generate an output signal on an output 252 from the global shutter readout circuit 254. As shown in the depicted example, the row select transistor 250 is configured to be controlled in response to a row select row signal RS_ROW.

In the illustrated example, a floating diffusion 238 is coupled to the second terminal of the pixel enable transistor 236, the gate of the source follower transistor 248, the first storage transistor 240, and the second storage transistor 244 as shown. As such, the first storage transistor 240 and the first storage capacitor 242 are coupled between the floating diffusion 238 and a reference voltage (e.g., VM). Similarly, the second storage transistor 244 and the second storage capacitor 246 are coupled between the floating diffusion 238 and the reference voltage VM.

In the example depicted in FIG. 2, global shutter readout circuit 254 also includes a bias transistor 232 coupled between the first terminal of the pixel enable transistor 236 and ground (e.g., AGND). In the example, a cascode transistor 234 is coupled between the first terminal of the pixel enable transistor 236 and the bias transistor 232. In one example, a gate of the bias transistor 232 is coupled to a first bias voltage Vb and a gate of the cascode transistor 234 is coupled to a second bias voltage Vc.

Figure 3:
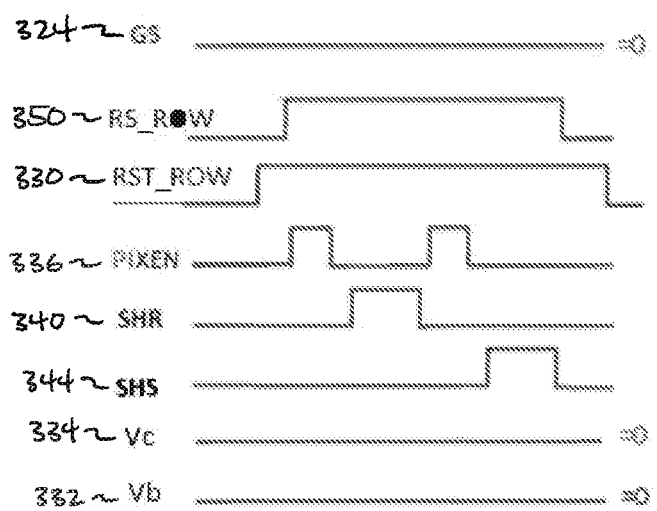
FIG. 3 illustrates a timing diagram of signal values in an example pixel circuit and voltage domain global shutter readout circuit during a rolling readout period in accordance with the teachings of the present disclosure.

FIG. 3 illustrates a timing diagram of signal values in an example pixel circuit and voltage domain global shutter readout circuit during a rolling readout period in accordance with the teachings of the present disclosure. It is appreciated that the signals depicted in FIG. 3 may be examples of the signals depicted in the pixel circuit 204 and global shutter readout circuit 254 shown in FIG. 2, and that similarly named and numbered elements described above are coupled and function similarly below.

Referring now to the depicted example, FIG. 3 illustrates a row select signal GS 324, a row select row signal RS_ROW 350, a reset row control signal RST_ROW 330, a pixel enable signal PIXEN 336, a sample and hold reset control signal SHR 340, a sample and hold signal control signal SHS 344, a second bias voltage Vc 334, and a first bias voltage Vb 332 during a rolling readout period. It is appreciated that during operation of image sensor circuits, such as the pixel circuit 204 and global shutter readout circuit 254 shown in FIG. 2, there may be global precharge period followed by a rolling readout period, followed by a global discharge period, followed by a global transfer period.

Referring back to the timing diagram example depicted in FIG. 3, it is noted that the row select signal GS 324, the first bias voltage Vb 332, and the second bias voltage Vc 334 are zero throughout the rolling readout period. As illustrated, the reset row control signal RST_ROW 330 is configured to turn on the reset transistor 230 to reset the bitline 212 to the reset voltage VD. Next, the row select row signal RS_ROW 350 turns on the row select transistor 250 and the pixel enable signal PIXEN 336 is pulsed on and off while the reset transistor 230 is still turned on to reset the floating diffusion 238 to the reset voltage VD.

In the various examples, when the pixel enable signal PIXEN 336 goes low, the gate source voltage VGs of the pixel enable transistor 236 will be low enough to cut the leakage path from the floating diffusion 238 through the cascode transistor 234 and the bias transistor 232 to ground AGND completely. Therefore, during operation, the leakage path from the floating diffusion 238 to ground AGND through the cascode transistor 234 and the bias transistor 232 is completely cutoff after the pixel enable transistor 236 is turned off in accordance with the teachings of the present invention. Thus, fixed pattern noise and nonuniformity between pixels in images is reduced or eliminated in accordance with the teachings of the present invention After the pixel enable signal PIXEN 336 is off, the sample and hold reset control signal SHR 340 is pulsed to charge share the black charge sampled during a global transfer period with the reset value sampled at floating diffusion 238 in first storage capacitor 242. Next the pixel enable signal PIXEN 336 is pulsed on and off again while the reset transistor 230 is still turned on to reset the floating diffusion 238 to the reset voltage VD. After the pixel enable signal PIXEN 336 is off, the sample and hold signal control signal SHS 344 is then pulsed to charge share the signal charge sampled during a global transfer period with the reset value sampled at floating diffusion 238 in second storage capacitor 246. Next, the row select row signal RS_ROW 350 turns off the row select transistor 250 and then the reset row control signal RST_ROW 330 is configured to turn off the reset transistor 230 after rolling readout is finished.

Figure 4:
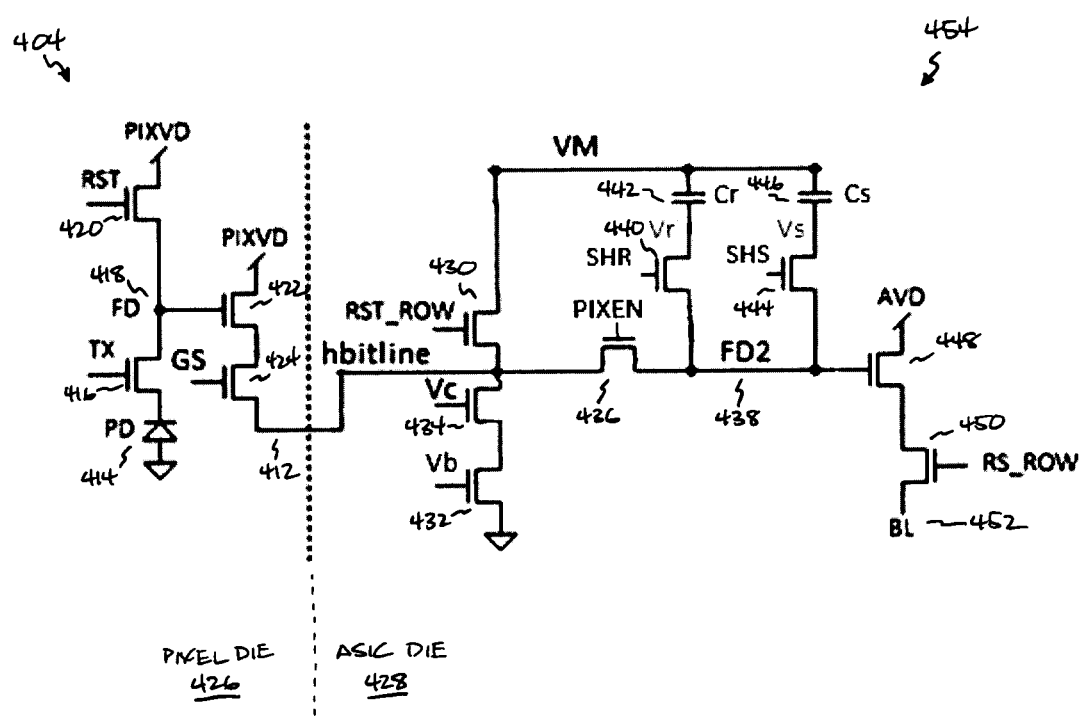
FIG. 4 shows a schematic of another example of a pixel circuit and a voltage domain global shutter readout circuit in an image sensor in accordance with the teachings of the present invention.

FIG. 4 shows a schematic of another example of a pixel circuit 404 and a voltage domain global shutter readout circuit 454 in an image sensor in accordance with the teachings of the present invention. It is appreciated that the pixel circuit 404 of FIG. 4 may be another example of one of the pixel circuits 104 included in pixel array 102 as shown in FIG. 1, and that pixel circuit 404 and a voltage domain global shutter readout circuit 454 depicted in FIG. 4 shares some similarities with pixel circuit 204 and global shutter readout circuit 254 depicted in FIG. 2 discussed in detail above.

For instance, as shown in the example depicted in FIG. 4, the pixel circuit 404 may be included in a pixel die 426 and the global shutter readout circuit 454 may be included in a readout circuit included in an ASIC die 428. In one example, pixel circuit 404 includes a photodiode 414, which is coupled to photogenerate image charge in response to incident light. A transfer transistor 416 is coupled to transfer the photogenerated image charge from the photodiode 414 to a floating diffusion 418 in response to a transfer signal TX. A reset transistor 420 is coupled to a pixel voltage supply (e.g., PIXVD) to reset the floating diffusion 418 in response to a reset signal RST. The gate of a source follower transistor 422 is coupled to convert the charge in the floating diffusion 418 to an image data signal, which is coupled to be output through a row select transistor 424 through a bitline 412 in response to a row select signal GS. In an imaging system that utilizes correlated double sampling (CDS), the charge on the floating diffusion 418 is also read out through bitline 412 after a floating diffusion reset operation to obtain a reset level, and the charge on the floating diffusion 418 is also read out through bitline 412 after the image charge is transferred to the floating diffusion 418 to obtain a signal level.

In the example depicted in FIG. 4, the global shutter readout circuit 454 includes a reset transistor 430 coupled between a reset voltage (e.g., VM) and the bitline 412 from pixel circuit 404. In one example, the reset transistor 430 is configured to be controlled in response to a reset row control signal RST_ROW. As shown in the depicted example, a pixel enable transistor 436 includes a first terminal (e.g., a first source/drain terminal) coupled to the bitline 412 and the reset transistor 430. A source follower transistor 448 includes a gate coupled to a second terminal (e.g., a second source/drain terminal) of the pixel enable transistor 436 such that the pixel enable transistor 436 is coupled between the reset transistor 430 and the source follower transistor 448. In one example, the first and second terminals of the pixel enable transistor 436 are coupled together in response to a pixel enable signal PIXEN coupled to a third terminal (e.g., gate) of the pixel enable transistor.

As shown in the example shown in FIG. 4, a first storage transistor 440 is coupled to the second terminal of the pixel enable transistor 436 and the gate of the source follower transistor 448. A first storage capacitor 442 is coupled to the first storage transistor 440. As shown, second storage transistor 444 is also coupled to the second terminal of the pixel enable transistor 436 and the gate of the source follower transistor. A second storage capacitor 446 is coupled to the second storage transistor 444. As shown in the depicted example, the first storage transistor 440 is configured to be controlled in response to a sample and hold reset control signal SHR and the second storage transistor 444 is configured to be controlled in response to a sample and hold signal control signal SHS.

In the example, a row select transistor 450 is coupled to the source follower transistor 448 such that the source follower transistor 448 and the row select transistor 450 are coupled between a voltage supply (e.g., AVD) and an output 452 of the global shutter readout circuit 454. In operation, the row select transistor 450 is coupled to the source follower transistor 448 to generate an output signal on an output 452 from the global shutter readout circuit 454. As shown in the depicted example, the row select transistor 450 is configured to be controlled in response to a row select row signal RS_ROW.

In the illustrated example, a floating diffusion 438 is coupled to the second terminal of the pixel enable transistor 436, the gate of the source follower transistor 448, the first storage transistor 440, and the second storage transistor 444 as shown. As such, the first storage transistor 440 and the first storage capacitor 442 are coupled between the floating diffusion 438 and a reference voltage (e.g., VM). Similarly, the second storage transistor 444 and the second storage capacitor 446 are coupled between the floating diffusion 438 and the reference voltage VM.

One of the differences between the example depicted in FIG. 4 and the example depicted in FIG. 2 is that in the example depicted in FIG. 4, the reset transistor 430, the first storage capacitor 442 and the second storage capacitor 446 are all coupled to the same reference voltage (e.g., VM) as shown. Therefore, during a discharge operation, first and second electrodes (e.g., both ends) of the first storage capacitor and first and second electrodes (e.g., both ends) of the second storage capacitor are all configured to be coupled locally within global shutter readout circuit 454 to the same reference voltage (e.g., VM) to discharge the first storage capacitor 442 and the second storage capacitor 446 when the reset transistor 430, the pixel enable transistor 436, the first storage transistor 440, and the second storage transistor 444 are turned on. Therefore, with the local path through the reset transistor 430, the pixel enable transistor 436, the first storage transistor 440, and the second storage transistor 444 discharge the first storage capacitor 442 and the second storage capacitor 442 to initial values, the discharge time to initialize a voltage Vr across first storage capacitor 442 and a voltage Vs across second capacitor 446 is significantly reduced in accordance with the teachings of the present invention.

In the example depicted in FIG. 4, global shutter readout circuit 454 also includes a bias transistor 432 coupled between the first terminal of the pixel enable transistor 436 and ground (e.g., AGND). In the example, a cascode transistor 434 is coupled between the first terminal of the pixel enable transistor 436 and the bias transistor 432. In one example, a gate of the bias transistor 432 is coupled to a first bias voltage Vb and a gate of the cascode transistor 434 is coupled to a second bias voltage Vc.

Figure 5:
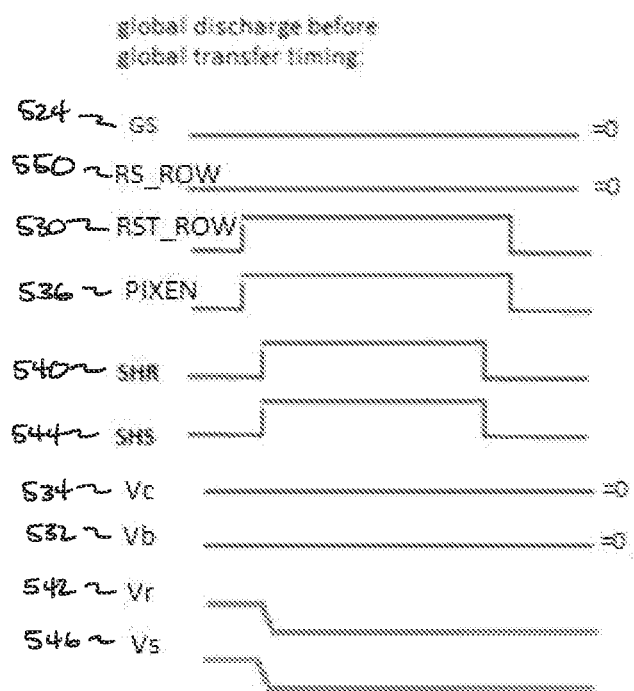
FIG. 5 illustrates a timing diagram of signal values in another example pixel circuit and voltage domain global shutter readout circuit during a global discharge period before a global transfer period in accordance with the teachings of the present disclosure.

FIG. 5 illustrates a timing diagram of signal values in another example pixel circuit and voltage domain global shutter readout circuit during a global discharge period before a global transfer in accordance with the teachings of the present disclosure. It is appreciated that the signals depicted in FIG. 5 may be examples of the signals depicted in the pixel circuit 404 and global shutter readout circuit 454 shown in FIG. 4, and that similarly named and numbered elements described above are coupled and function similarly below.

Referring now to the depicted example, FIG. 5 illustrates a row select signal GS 524, a row select row signal RS_ROW 550, a reset row control signal RST_ROW 530, a pixel enable signal PIXEN 536, a sample and hold reset control signal SHR 540, a sample and hold signal control signal SHS 544, a second bias voltage Vc 534, a first bias voltage Vb 532, a first storage capacitor voltage Vr 542, and a second storage capacitor voltage Vs 546 during a global discharge period before a global transfer period. It is appreciated that during operation of image sensor circuits, such as the pixel circuit 404 and global shutter readout circuit 454 shown in FIG. 4, there may be global precharge period followed by a rolling readout period, followed by a global discharge period, followed by a global transfer period.

Referring back to the timing diagram example depicted in FIG. 5, it is noted that the row select signal GS 524, the row select row signal RS_ROW 550, the first bias voltage Vb 532, and the second bias voltage Vc 534 are zero throughout the global discharge period. As illustrated, the reset row control signal RST_ROW 530 and the pixel enable signal PIXEN 536 are configured to turn on the reset transistor 430 and the pixel enable transistor 436 to reset the bitline 412 and the floating diffusion 438 to the reset voltage VM. Next, the sample and hold reset control signal SHR 540 and the sample and hold signal control signal SHS 544 are configured to turn on the first storage transistor 440 and the second storage transistor 444 to discharge the first storage capacitor voltage Vr 542 and the second storage capacitor voltage Vs 546.

As shown in the depicted example, the first storage capacitor voltage Vr 542 and the second storage capacitor voltage Vs 546 are discharged quickly both as both electrodes of the first storage capacitor 442 and both electrodes of the second storage capacitor 446 are locally coupled within global shutter readout circuit 454 to the same reference voltage (e.g., VM) to discharge the first storage capacitor 442 and the second storage capacitor 442 when the reset transistor 430, the pixel enable transistor 436, the first storage transistor 440, and the second storage transistor 444 are turned on in accordance with the teachings of the present invention.

After first storage capacitor 442 and the second storage capacitor 446 are discharged, the sample and hold reset control signal SHR 540 and the sample and hold signal control signal SHS 544 are configured to turn off the first storage transistor 440 and the second storage transistor 444, and then the reset row control signal RST_ROW 530 and the pixel enable signal PIXEN 536 are configured to turn off the reset transistor 436 and the reset transistor 430.

Figure 6:
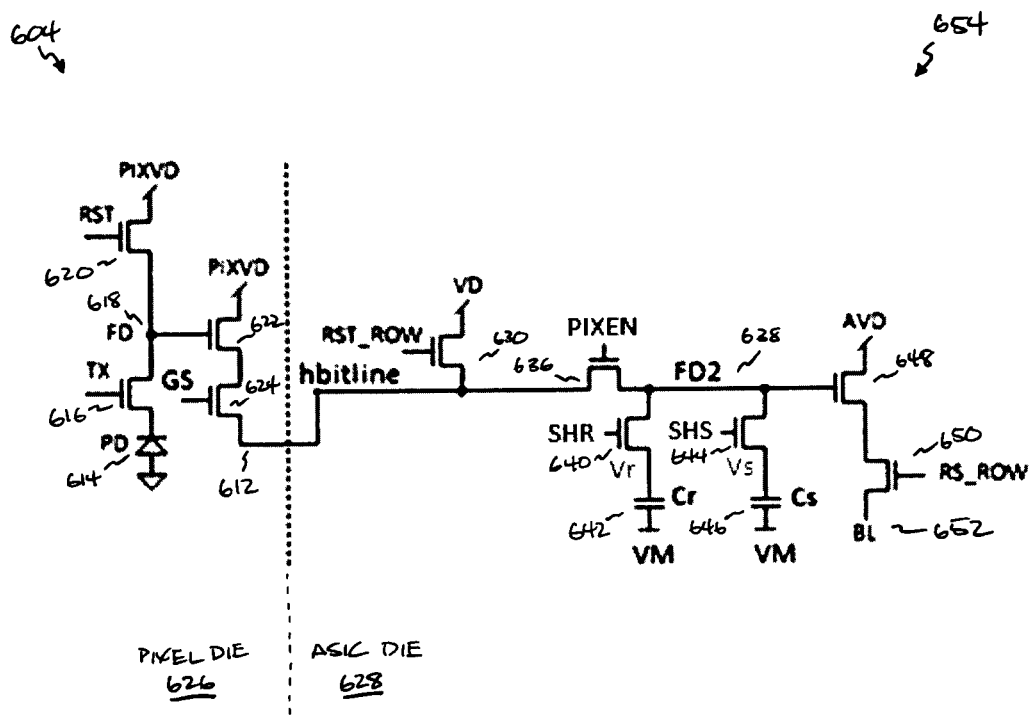
FIG. 6 shows a schematic of yet another example of a pixel circuit and a voltage domain global shutter readout circuit in an image sensor in accordance with the teachings of the present invention.

FIG. 6 shows a schematic of yet another example of a pixel circuit 604 and a voltage domain global shutter readout circuit 654 in an image sensor in accordance with the teachings of the present invention. It is appreciated that the pixel circuit 604 of FIG. 6 may be yet another example of one of the pixel circuits 104 included in pixel array 102 as shown in FIG. 1, and that pixel circuit 604 and a voltage domain global shutter readout circuit 654 depicted in FIG. 6 shares some similarities with pixel circuit 404 and global shutter readout circuit 454 depicted in FIG. 4 and/or with pixel circuit 204 and global shutter readout circuit 254 depicted in FIG. 2 discussed in detail above.

For instance, as shown in the example depicted in FIG. 6, the pixel circuit 604 may be included in a pixel die 626 and the global shutter readout circuit 654 may be included in a readout circuit included in an ASIC die 628. In one example, pixel circuit 604 includes a photodiode 614, which is coupled to photogenerate image charge in response to incident light. A transfer transistor 616 is coupled to transfer the photogenerated image charge from the photodiode 614 to a floating diffusion 618 in response to a transfer signal TX. A reset transistor 620 is coupled to a pixel voltage supply (e.g., PIXVD) to reset the floating diffusion 618 in response to a reset signal RST. The gate of a source follower transistor 622 is coupled to convert the charge in the floating diffusion 618 to an image data signal, which is coupled to be output through a row select transistor 624 through a bitline 612 in response to a row select signal GS. In an imaging system that utilizes correlated double sampling (CDS), the charge on the floating diffusion 618 is also read out through bitline 612 after a floating diffusion reset operation to obtain a reset level, and the charge on the floating diffusion 618 is also read out through bitline 612 after the image charge is transferred to the floating diffusion 618 to obtain a signal level.

Continuing with the depicted example, the global shutter readout circuit 654 includes a reset transistor 630 coupled between a reset voltage (e.g., VD) and the bitline 612 from pixel circuit 604. In one example, the reset transistor 630 is configured to be controlled in response to a reset row control signal RST_ROW. As shown in the depicted example, a pixel enable transistor 636 includes a first terminal (e.g., a first source/drain terminal) coupled to the bitline 612 and the reset transistor 630. A source follower transistor 648 includes a gate coupled to a second terminal (e.g., a second source/drain terminal) of the pixel enable transistor 636 such that the pixel enable transistor 636 is coupled between the reset transistor 630 and the source follower transistor 648. In one example, the first and second terminals of the pixel enable transistor 636 are coupled together in response to a pixel enable signal PIXEN coupled to a third terminal (e.g., gate) of the pixel enable transistor.

As shown in the example shown in FIG. 6, a first storage transistor 640 is coupled to the second terminal of the pixel enable transistor 636 and the gate of the source follower transistor 648. A first storage capacitor 642 is coupled to the first storage transistor 640. As shown, second storage transistor 644 is also coupled to the second terminal of the pixel enable transistor 636 and the gate of the source follower transistor. A second storage capacitor 646 is coupled to the second storage transistor 644. As shown in the depicted example, the first storage transistor 640 is configured to be controlled in response to a sample and hold reset control signal SHR and the second storage transistor 644 is configured to be controlled in response to a sample and hold signal control signal SHS.

In the example, a row select transistor 650 is coupled to the source follower transistor 648 such that the source follower transistor 648 and the row select transistor 650 are coupled between a voltage supply (e.g., AVD) and an output 652 of the global shutter readout circuit 654. In operation, the row select transistor 650 is coupled to the source follower transistor 648 to generate an output signal on an output 652 from the global shutter readout circuit 654. As shown in the depicted example, the row select transistor 650 is configured to be controlled in response to a row select row signal RS_ROW.

In the illustrated example, a floating diffusion 638 is coupled to the second terminal of the pixel enable transistor 636, the gate of the source follower transistor 648, the first storage transistor 640, and the second storage transistor 644 as shown. As such, the first storage transistor 640 and the first storage capacitor 642 are coupled between the floating diffusion 638 and a reference voltage (e.g., VM). Similarly, the second storage transistor 644 and the second storage capacitor 646 are coupled between the floating diffusion 638 and the reference voltage VM.

One of the differences between the example depicted in FIG. 6 and the example depicted in FIG. 2 is that in the example depicted in FIG. 6, is that the global shutter readout circuit 654 does not include the bias transistor and the cascode transistor coupled between the first terminal of the pixel enable transistor 636 and/or the bitline 612 and ground. Therefore, it is noted that there is no leakage path from the floating diffusion to ground in the global shutter readout circuit 654. As such, it is appreciated that noise is reduced as the random noise (RN) that would be contributed to by a bias transistor and a cascode transistor coupled between the first terminal of the pixel enable transistor 636 and/or the bitline 612 and ground is removed. It is further appreciated that the size of the ASIC die 628 may be smaller. In one example, the initial voltages Vr across first storage capacitor 642 and Vs across second capacitor 646 are reset to the reset voltage (e.g., VD) during a global discharge period before a global transfer period.

Figure 7:
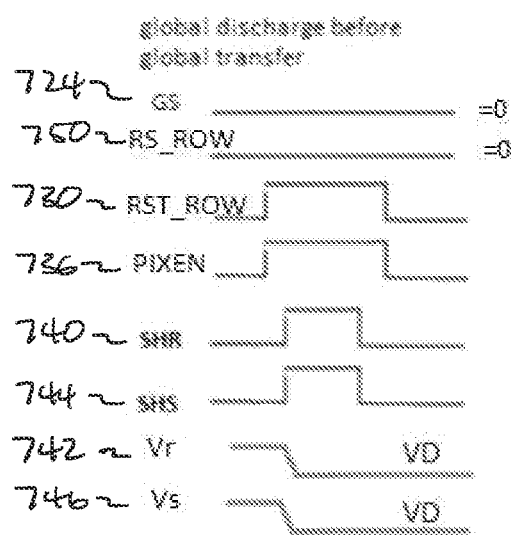
FIG. 7 illustrates a timing diagram of signal values in yet another example pixel circuit and voltage domain global shutter readout circuit during a global discharge period before a global transfer period in accordance with the teachings of the present disclosure.

To illustrate, FIG. 7 illustrates a timing diagram of signal values in yet another example pixel circuit and voltage domain global shutter readout circuit during a global discharge period before a global transfer period in accordance with the teachings of the present disclosure. It is appreciated that the signals depicted in FIG. 7 may be examples of the signals depicted in the pixel circuit 604 and global shutter readout circuit 654 shown in FIG. 6, and that similarly named and numbered elements described above are coupled and function similarly below.

Referring now to the depicted example, FIG. 7 illustrates a row select signal GS 724, a row select row signal RS_ROW 750, a reset row control signal RST_ROW 730, a pixel enable signal PIXEN 736, a sample and hold reset control signal SHR 740, a sample and hold signal control signal SHS 744, a first storage capacitor voltage Vr 742, and a second storage capacitor voltage Vs 746 during a global discharge period before a global transfer period. It is appreciated that during operation of image sensor circuits, such as the pixel circuit 604 and global shutter readout circuit 654 shown in FIG. 6, there may be global precharge period followed by a rolling readout period, followed by a global discharge period, followed by a global transfer period.

Referring back to the timing diagram example depicted in FIG. 7, it is noted that the row select signal GS 724 and the row select row signal RS_ROW 750 are zero throughout the global discharge period. As illustrated, the reset row control signal RST_ROW 730 and the pixel enable signal PIXEN 736 are configured to turn on the reset transistor 630 and the pixel enable transistor 636 to reset the bitline 612 and the floating diffusion 638 to the reset voltage VD. Next, the sample and hold reset control signal SHR 740 and the sample and hold signal control signal SHS 744 are configured to turn on the first storage transistor 640 and the second storage transistor 644 to discharge the first storage capacitor voltage Vr 742 and the second storage capacitor voltage Vs 746 to the reset voltage VD. As such, the initial voltages for Vr 742 across first storage capacitor 642 and Vs 746 across second capacitor 646 are reset to the reset voltage VD during the global discharge period before a global transfer period.

After first storage capacitor 642 and the second storage capacitor 646 are discharged to the reset voltage VD, the sample and hold reset control signal SHR 740 and the sample and hold signal control signal SHS 744 are configured to turn off the first storage transistor 640 and the second storage transistor 644, and then the reset row control signal RST_ROW 730 and the pixel enable signal PIXEN 736 are configured to turn off the reset transistor 636 and the reset transistor 630.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A global shutter readout circuit, comprising:
    a reset transistor coupled between a reset voltage and a bitline from a pixel circuit;
    a pixel enable transistor having a first terminal coupled to the bitline and the reset transistor;
    a source follower transistor having a gate coupled to a second terminal of the pixel enable transistor such that the pixel enable transistor is coupled between the reset transistor and the source follower transistor, wherein the first and second terminals of the pixel enable transistor are coupled together in response to a pixel enable signal coupled to a third terminal of the pixel enable transistor;
    a first storage transistor coupled to the second terminal of the pixel enable transistor and the gate of the source follower transistor;
    a first storage capacitor coupled to the first storage transistor;
    a second storage transistor coupled to the second terminal of the pixel enable transistor and the gate of the source follower transistor;
    a second storage capacitor coupled to the second storage transistor; and
    a row select transistor coupled to the source follower transistor to generate an output signal from the global shutter readout circuit.

2. The global shutter readout circuit of claim 1, further comprising a floating diffusion, wherein the second terminal of the pixel enable transistor, the gate of the source follower transistor, the first storage transistor, and the second storage transistor are coupled to the floating diffusion.

3. The global shutter readout circuit of claim 2, wherein the first storage transistor and the first storage capacitor are coupled between the floating diffusion and a reference voltage, wherein the second storage transistor and the second storage capacitor are coupled between the floating diffusion and the reference voltage.

4. The global shutter readout circuit of claim 3, further comprising a bias transistor coupled between the first terminal of the pixel enable transistor and ground.

5. The global shutter readout circuit of claim 4, further comprising a cascode transistor coupled between the first terminal of the pixel enable transistor and the bias transistor.

6. The global shutter readout circuit of claim 5, wherein a gate of the bias transistor is coupled to a first bias voltage, wherein a gate of the cascode transistor is coupled to a second bias voltage.

7. The global shutter readout circuit of claim 5,
    wherein the reset transistor is configured to be turned on to reset the bitline from the pixel circuit to the reset voltage,
    wherein the pixel enable transistor is configured to be pulsed on and off while the reset transistor is turned on to reset the floating diffusion to the reset voltage, wherein a leakage path from the floating diffusion to ground through the cascode transistor and the bias transistor is completely cutoff after the pixel enable transistor is turned off.

8. The global shutter readout circuit of claim 3, wherein the reset voltage and the reference voltage are the same.

9. The global shutter readout circuit of claim 8,
    wherein the reset transistor, the pixel enable transistor, the first storage transistor, and the second storage transistor are all configured to be turned on to reset the bitline, the floating diffusion, the first storage capacitor, and the second storage capacitor,
    wherein first and second electrodes of the first storage capacitor and first and second electrodes of the second storage capacitor are all configured to be coupled to the same reference voltage to discharge the first storage capacitor and the second storage capacitor while the reset transistor, the pixel enable transistor, the first storage transistor, and the second storage transistor are turned on.

10. The global shutter readout circuit of claim 3,
    wherein the reset transistor is configured to be turned on to reset the bitline from the pixel circuit to the reset voltage,
    wherein the pixel enable transistor is configured to be pulsed on and off to reset the floating diffusion to the reset voltage while the reset transistor is turned on,
    wherein the first storage transistor and the second storage transistor are configured to be pulsed on and off to charge share a black charge sampled during a global transfer period with a sampled reset value at the floating diffusion at the first storage capacitor and to charge share a signal charge sampled during the global transfer period with a sampled reset value at the floating diffusion at the second storage capacitor, wherein there is no leakage path from the floating diffusion to ground in the global shutter readout circuit, wherein there is no bias transistor and no cascode transistor coupled between the first terminal of the pixel enable transistor and ground.

11. The global shutter readout circuit of claim 10, wherein initial voltages across the first storage capacitor and the second storage capacitor are configured to be reset to the reset voltage during a global discharge period before the global transfer period.

12. An imaging system, comprising:
a pixel array including a plurality of pixel circuits;
control circuitry coupled to the pixel array to control operation of the pixel array; and
readout circuitry coupled to the pixel array to read out image data from the pixel array, wherein the readout circuitry includes a plurality of global shutter readout circuits, wherein each global shutter readout circuit comprises:
a reset transistor coupled between a reset voltage and a bitline coupled to the pixel array;
a pixel enable transistor having a first terminal coupled to the bitline and the reset transistor;
a source follower transistor having a gate coupled to a second terminal of the pixel enable transistor such that the pixel enable transistor is coupled between the reset transistor and the source follower transistor, wherein the first and second terminals of the pixel enable transistor are coupled together in response to a pixel enable signal coupled to a third terminal of the pixel enable transistor;
a first storage transistor coupled to the second terminal of the pixel enable transistor and the gate of the source follower transistor;
a first storage capacitor coupled to the first storage transistor;
a second storage transistor coupled to the second terminal of the pixel enable transistor and the gate of the source follower transistor;
a second storage capacitor coupled to the second storage transistor; and
a row select transistor coupled to the source follower transistor to generate an output signal from the global shutter readout circuit.

13. The imaging system of claim 12, wherein each global shutter readout circuit further comprises a floating diffusion, wherein the second terminal of the pixel enable transistor, the gate of the source follower transistor, the first storage transistor, and the second storage transistor are coupled to the floating diffusion.

14. The imaging system of claim 13, wherein the first storage transistor and the first storage capacitor are coupled between the floating diffusion and a reference voltage, wherein the second storage transistor and the second storage capacitor are coupled between the floating diffusion and the reference voltage.

15. The imaging system of claim 14, wherein each global shutter readout circuit further comprises a bias transistor coupled between the first terminal of the pixel enable transistor and ground.

16. The imaging system of claim 15, wherein each global shutter readout circuit further comprises a cascode transistor coupled between the first terminal of the pixel enable transistor and the bias transistor.

17. The imaging system of claim 16, wherein a gate of the bias transistor is coupled to a first bias voltage, wherein a gate of the cascode transistor is coupled to a second bias voltage.

18. The imaging system of claim 16,
wherein the reset transistor is configured to be turned on to reset the bitline from the pixel circuit to the reset voltage,
wherein the pixel enable transistor is configured to be pulsed on and off while the reset transistor is turned on to reset the floating diffusion to the reset voltage,
wherein a leakage path from the floating diffusion to ground through the cascode transistor and the bias transistor is completely cutoff after the pixel enable transistor is turned off.

19. The imaging system of claim 14, wherein the reset voltage and the reference voltage are the same.

20. The imaging system of claim 19,
wherein the reset transistor, the pixel enable transistor, the first storage transistor, and the second storage transistor are all configured to be turned on to reset the bitline, the floating diffusion, the first storage capacitor, and the second storage capacitor,
wherein first and second electrodes of the first storage capacitor and first and second electrodes of the second storage capacitor are all configured to be coupled to the same reference voltage to discharge the first storage capacitor and the second storage capacitor while the reset transistor, the pixel enable transistor, the first storage transistor, and the second storage transistor are turned on.

21. The imaging system of claim 14,
wherein the reset transistor is configured to be turned on to reset the bitline from the pixel circuit to the reset voltage,
wherein the pixel enable transistor is configured to be pulsed on and off to reset the floating diffusion to the reset voltage while the reset transistor is turned on,
wherein the first storage transistor and the second storage transistor are configured to be pulsed on and off to charge share a black charge sampled during a global transfer period with a sampled reset value at the floating diffusion at the first storage capacitor and to charge share a signal charge sampled during the global transfer period with a sampled reset value at the floating diffusion at the second storage capacitor,
wherein there is no leakage path from the floating diffusion to ground in the global shutter readout circuit,
wherein there is no bias transistor and no cascode transistor coupled between the first terminal of the pixel enable transistor and ground.

22. The imaging system of claim 21, wherein initial voltages across the first storage capacitor and the second storage capacitor are configured to be reset to the reset voltage during a global discharge period before the global transfer period.

* * * * *